(12) United States Patent
Elyashiv et al.

(10) Patent No.: US 11,711,310 B2
(45) Date of Patent: Jul. 25, 2023

(54) SYSTEM AND METHOD FOR DETERMINING A NETWORK PERFORMANCE PROPERTY IN AT LEAST ONE NETWORK

(71) Applicant: TWEENZNET LTD., Tel Aviv-Jaffa (IL)

(72) Inventors: Eyal Elyashiv, Ramat Hasharon (IL); Eliezer Upfal, Providence, RI (US); Aviv Yehezkel, Ramat-Gan (IL)

(73) Assignee: TWEENZNET LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/024,452

(22) Filed: Sep. 17, 2020

(65) Prior Publication Data

US 2021/0083985 A1    Mar. 18, 2021

Related U.S. Application Data

(60) Provisional application No. 63/006,936, filed on Apr. 8, 2020, provisional application No. 62/901,839, filed on Sep. 18, 2019.

(51) Int. Cl.
*H04L 47/2483* (2022.01)
*H04L 43/062* (2022.01)

(52) U.S. Cl.
CPC ........ *H04L 47/2483* (2013.01); *H04L 43/062* (2013.01)

(58) Field of Classification Search
CPC ............................ H04L 47/2483; H04L 43/062
See application file for complete search history.

(56) References Cited

U.S. PATENT DOCUMENTS 6,208,640 B1 * 3/2001 Spell ...................... H04L 47/10
370/358
8,401,982 B1    3/2013 Satish et al.
(Continued)

FOREIGN PATENT DOCUMENTS

CN    104253819    12/2014
CN    107465643    12/2017
(Continued)

OTHER PUBLICATIONS

S. Bhattacharyya, A. Madeira, S. Muthukrishnan, and T. Ye. "How to scalably and accurately skip past streams". In ICDE, pp. 654-663 (2007).

(Continued)

*Primary Examiner* — John A Follansbee
*Assistant Examiner* — Raqiul A Choudhury
(74) *Attorney, Agent, or Firm* — Pearl Cohen Zedek Latzer Baratz LLP

(57) ABSTRACT

Systems and methods of determining a network performance property in at least one computer network, including: sampling traffic in active communication with the at least one computer network, analyzing the sampled traffic to group communication packets to flows, and predicting at least one network property of the at least one network based on the grouped communication packets and based on at least one traffic parameter in the at least one network, where the at least one traffic parameter is selected from the group consisting of: union of packet streams, intersection of packet streams, and differences of packet streams, and where the predicted at least one network property is selected from the group consisting of: total number of flows, number of flows with a predefined characteristic, number of packets, and volume of packets.

20 Claims, 6 Drawing Sheets

(56) References Cited

U.S. PATENT DOCUMENTS

| | | | |
|---|---|---|---|
| 8,479,276 B1 | 7/2013 | Vaystikh | |
| 8,713,190 B1 * | 4/2014 | Goodall | H04L 41/142 709/231 |
| 9,166,993 B1 | 10/2015 | Liu | |
| 9,317,686 B1 | 4/2016 | Ye | |
| 9,690,938 B1 | 6/2017 | Saxe et al. | |
| 9,942,254 B1 | 4/2018 | Averbuch | |
| 10,032,025 B1 | 7/2018 | Patton | |
| 10,078,459 B1 | 9/2018 | Natanzon | |
| 10,122,752 B1 | 11/2018 | Soman et al. | |
| 10,242,665 B1 | 3/2019 | Abeloe | |
| 10,248,577 B2 | 4/2019 | Borlick | |
| 10,505,955 B2 | 12/2019 | Mestha | |
| 10,554,688 B1 | 2/2020 | Wueest | |
| 10,802,489 B1 | 10/2020 | Abeloe | |
| 10,834,121 B2 | 11/2020 | Boachare | |
| 10,893,068 B1 | 1/2021 | Khalid | |
| 11,082,441 B1 | 8/2021 | Bouguerra | |
| 11,159,407 B2 | 10/2021 | Reid | |
| 11,269,622 B2 | 3/2022 | Alam | |
| 11,368,432 B2 | 6/2022 | Meyer | |
| 11,436,328 B1 | 9/2022 | Strogov | |
| 2004/0077347 A1 * | 4/2004 | Lauber | H04L 67/025 455/428 |
| 2006/0072709 A1 * | 4/2006 | Rancu | H04W 24/06 379/9.01 |
| 2009/0034521 A1 * | 2/2009 | Kato | G06F 21/34 370/389 |
| 2009/0144545 A1 | 6/2009 | Dhuvur et al. | |
| 2010/0058122 A1 | 3/2010 | Compton | |
| 2010/0157840 A1 * | 6/2010 | Sen | H04L 43/0835 370/253 |
| 2011/0238855 A1 * | 9/2011 | Korsunsky | G06F 21/56 709/231 |
| 2011/0242994 A1 * | 10/2011 | Carvalho | H04L 43/022 370/252 |
| 2012/0216627 A1 | 8/2012 | Augenstein | |
| 2013/0263272 A1 | 10/2013 | Banerjee | |
| 2014/0090061 A1 | 3/2014 | Avasarala et al. | |
| 2015/0128263 A1 | 5/2015 | Raugas et al. | |
| 2016/0028752 A1 | 1/2016 | Di Pietro et al. | |
| 2016/0055410 A1 | 2/2016 | Spagnola | |
| 2016/0065424 A1 * | 3/2016 | Lee | H04L 47/11 370/235 |
| 2016/0234167 A1 | 8/2016 | Engel | |
| 2017/0316342 A1 | 11/2017 | Franc | |
| 2018/0007069 A1 | 1/2018 | Hunt | |
| 2018/0007074 A1 | 1/2018 | Kune | |
| 2018/0048693 A1 | 2/2018 | Gulbinas et al. | |
| 2018/0069893 A1 | 3/2018 | Amit | |
| 2018/0091506 A1 * | 3/2018 | Chow | G06Q 20/085 |
| 2018/0107824 A1 | 4/2018 | Gibbons, Jr. | |
| 2018/0109551 A1 | 4/2018 | Wetterwald et al. | |
| 2018/0113638 A1 | 4/2018 | Petersen | |
| 2018/0198821 A1 | 7/2018 | Gopalakrishna | |
| 2018/0205750 A1 | 7/2018 | Kohout | |
| 2018/0211038 A1 | 7/2018 | Breiman | |
| 2018/0212987 A1 | 7/2018 | Tamir | |
| 2018/0270262 A1 | 9/2018 | Zhang et al. | |
| 2018/0373722 A1 | 12/2018 | Ulasen | |
| 2019/0020663 A1 | 1/2019 | Bartos | |
| 2019/0042744 A1 | 2/2019 | Rajasekharan | |
| 2019/0068618 A1 | 2/2019 | Mestha | |
| 2019/0087572 A1 | 3/2019 | Ellam | |
| 2019/0130097 A1 | 5/2019 | Berler | |
| 2019/0147343 A1 | 5/2019 | Lev | |
| 2019/0171936 A1 | 6/2019 | Karras | |
| 2019/0190938 A1 * | 6/2019 | Oba | H04L 63/1416 |
| 2019/0215329 A1 | 7/2019 | Levy | |
| 2019/0221311 A1 | 7/2019 | Takeuchi | |
| 2019/0228099 A1 | 7/2019 | Bajaj | |
| 2019/0236273 A1 | 8/2019 | Saxe | |
| 2019/0253452 A1 | 8/2019 | Latapie | |
| 2019/0258426 A1 | 8/2019 | Roh | |
| 2019/0259920 A1 | 8/2019 | Lie | |
| 2019/0303573 A1 | 10/2019 | Chelarescu | |
| 2019/0317901 A1 | 10/2019 | Kachare | |
| 2019/0318244 A1 | 10/2019 | Alvarez | |
| 2019/0332769 A1 | 10/2019 | Fralick | |
| 2019/0385057 A1 | 12/2019 | Litichever | |
| 2020/0021620 A1 | 1/2020 | Purathepparambil | |
| 2020/0034537 A1 | 1/2020 | Chen | |
| 2020/0067935 A1 | 2/2020 | Carnes, III | |
| 2020/0089876 A1 | 3/2020 | Aharoni | |
| 2020/0089884 A1 | 3/2020 | Winokur | |
| 2020/0090002 A1 | 3/2020 | Zhu | |
| 2020/0097653 A1 | 3/2020 | Mehta | |
| 2020/0133489 A1 | 4/2020 | Martin | |
| 2020/0137110 A1 | 4/2020 | Tyler | |
| 2020/0137384 A1 | 4/2020 | Kwong | |
| 2020/0204589 A1 | 6/2020 | Strogov | |
| 2020/0244672 A1 | 7/2020 | Grill | |
| 2020/0250522 A1 | 8/2020 | Meiri | |
| 2020/0272899 A1 | 8/2020 | Dunne | |
| 2020/0387609 A1 | 12/2020 | Hansen | |
| 2020/0387798 A1 | 12/2020 | Hewage | |
| 2020/0412757 A1 | 12/2020 | Siddiq | |
| 2021/0019403 A1 | 1/2021 | Mehta | |
| 2021/0026961 A1 | 1/2021 | Underwood | |
| 2021/0044563 A1 | 2/2021 | Reyes | |
| 2021/0044604 A1 | 2/2021 | Annen | |
| 2021/0049456 A1 | 2/2021 | Kursun | |
| 2021/0055907 A1 | 2/2021 | Bielby | |
| 2021/0072901 A1 | 3/2021 | Kale | |
| 2021/0072911 A1 | 3/2021 | Kale | |
| 2021/0072921 A1 | 3/2021 | Bielby | |
| 2021/0073127 A1 | 3/2021 | Bielby | |
| 2021/0099474 A1 | 4/2021 | Huang | |
| 2021/0216630 A1 | 7/2021 | Karr | |
| 2021/0264028 A1 | 8/2021 | Gene | |
| 2022/0232024 A1 | 7/2022 | Kapoor | |
| 2022/0261506 A1 | 8/2022 | Steinberg | |
| 2022/0311794 A1 | 9/2022 | Maya | |

FOREIGN PATENT DOCUMENTS

| | | | |
|---|---|---|---|
| WO | WO-2018/069928 | 4/2018 | |
| WO | WO-2019154483 A1 * | 8/2019 | H04W 40/12 |

OTHER PUBLICATIONS

T. Mori, T. Takine, J. Pan, R. Kawahara, M. Uchida, and S. Goto. "Identifying heavy-hitter flows from sampled flow statistics". IEICE Transactions, 90-B(11):3061-3072, (2007).

T. Mori, M. Uchida, R. Kawahara. J. Pan, and S. Goto. "Identifying elephant flows through periodically sampled packets". In Proceedings of the 4th ACM SIGCOMM Conference on Internet Measurement, pp. 115-120 (2004).

N. G. Duffield, C. Lund, and M. Thorup. Estimating flow distributions from sampled flow statistics. In Proceedings of the ACM SIGCOMM, Conference on Applications, Technologies, Architectures, and Protocols for Computer Communication, pp. 325-336 (2003).

B. F. Ribeiro, D. F. Towsley, T. Ye, and J. Bolot. "Fisher information of sampled packets: an application to flow size estimation". In Proceedings of the 6th ACM SIGCOMM Conference on Internet Measurement, pp. 1-11 (2006).

N. G. Duffield and C. Lund. "Predicting resource usage and estimation accuracy in an IP flow measurement collection infrastructure". In Proceedings of the 3rd ACM SIGCOMM Internet Measurement Conference, IMC, pp. 179-191 (2003).

N. G. Duffield, C. Lund, and M. Thorup. "Charging from sampled network usage". In Proceedings of the 1st ACM SIGCOMM Workshop on Internet Measurement, pp. 245-256 (2001).

N. G. Duffield, C. Lund, and M. Thorup. "Flow sampling under hard resource constraints." In Proceedings of the International Conference on Measurements and Modeling of Computer Systems, SIGMETRICS, pp. 85-96 (2004).

A. Kumar and J. J. Xu. "Sketch guided sampling—using on-line estimates of flow size for adaptive data collection". In INFOCOM (2006).

(56) References Cited

OTHER PUBLICATIONS

R. Cohen, L. Katzir and A. Yehezkel, "MTS Sketch for Accurate Estimation of Set-Expression Cardinalities from Small Samples". CoRR abs/1611.01853 (2016).
R. Cohen, L. Katzir and A. Yehezkel, "Cardinality Estimation Meets Good-Turing". Big Data Research, 9: 1-8 (2017).
Shtilerman E, Thompson CJ, Stone L, Bode M, Burgman M., "A novel method for estimating the number of species within a region". Proc. R. Soc. B 281: 20133009 (2014).
Bunge, J., Fitzpatrick, M.. "Estimating the Number of Species: A Review". Journal of the American Statistical Association, 88:421, 364-373. doi: 10.2307/2290733 (1993).
Chao, A. "Nonparametric Estimation of the Number of Classes in a Population". Scandinavian Journal of Statistics, 11(4), 265-270. Retrieved Jan. 20, 2020, from www.jstor.org/stable/4615964 (1984).
Good, I.J. "The population frequencies of species and the estimation of population parameters". Biometrika. V40(3-4): 237-264. doi:10.1093/biomet/40.3-4.237. JSTOR 2333344. MR 0061330 (1953).
Yang et al; A Simple Recurrent Unit Model Based Intrusion Detection System With DCGAN; IEEE (Year: 2019).
Maniath et al: Deep Learning LSTM based Ransomware Detection; IEEE (Year: 2017).
Hirano et al; Machine Learning Based Ransomware Detection Using Storage Access Patterns Obtained From Live-Forensic Hypervisor; IEEE (Year: 2019).
Xu et al; Malware Detection using Machine Learning Based Analysis of Virtual Memory Access Patterns; IEEE (Year: 2017).
Chen et al: Towards resilient machine learning for ransomware detection; ACM (Year: 2019).
Ahmed et al: Using Spatio-Temporal Information in API Calls with Machine Learning Algorithms for Malware Detection; ACM (Year: 2009).
Office Action for U.S. Appl. No. 17/104,190,dated Dec. 16, 2022.
Notice of Allowance of U.S. Appl. No. 17/104,190, dated Mar. 15, 2023.

\* cited by examiner

```
┌─────────────────────────────────────────┐
│ Sampling traffic in a location of the at least one │
│              network                    │
└─────────────────────────────────────────┘
         └─501      ↓
┌─────────────────────────────────────────┐
│ Analyzing the sampled traffic to group  │
│ communication packets to flows, wherein a│
│ flow is defined as a set of packets with a│
│ common property selected from the group │
│ consisting of: communication protocol, port│
│ number, encryption type, source IP address│
│        and destination IP address       │
└─────────────────────────────────────────┘
         └─502      ↓
┌─────────────────────────────────────────┐
│ Predicting at least one network property of the│
│ at least one network based on the grouped│
│ communication packets and based on at least│
│ one traffic parameter in the at least one│
│ network, wherein the at least one traffic│
│ parameter is selected from the group    │
│ consisting of: union of packet streams, │
│ intersection of packet streams, and differences│
│         of packet streams               │
└─────────────────────────────────────────┘
         └─503
```

FIG. 5

SYSTEM AND METHOD FOR DETERMINING A NETWORK PERFORMANCE PROPERTY IN AT LEAST ONE NETWORK

FIELD OF THE INVENTION

The present invention relates to traffic in computer networks. More particularly, the present invention relates to systems and methods for inferring network visibility from traffic samples and determining a network performance property in at least one computer network.

BACKGROUND OF THE INVENTION

In recent years, various computer networks are used for data communication. Such networks can be small household networks such as Wi-Fi networks, or larger networks in the scale of a small-business, city, enterprise etc.

For example, a smart city can have a dedicated communication network for traffic lights from which data is retrieved to a central point. As the traffic in these networks continuously increases, it may be required to quickly analyze traffic properties without the need of collecting, processing and analyzing massive amounts of data passing through the network.

While there are various network visibility solutions, none of them provides a complete network visibility of the entire (100%) large-scale network. Instead, existing solutions use external monitoring devices (with a network visibility appliance or agent) and are either limited by the network hardware, network architectures, or network traffic they can support. These devices constantly forward (e.g., using port mirroring or packet brokers) network traffic to the network visibility appliance, which in turn analyzes the input traffic data. Each appliance is limited by the size of traffic it can process per time unit, e.g., 'X' Gigabyte per second (denoted GBps). The appliance-based approach was well suited to traditional networks which had a simple architecture and only a small number of network components. However, it cannot cope with today's large-scale networks. In order to obtain complete network visibility, one may need to cover the entire (100%) network with hundreds of appliances, which is not scalable or practical in terms of operational costs and network overheads.

Additionally, estimating properties of a population from a sample of the population is an extensively studied field. Typical techniques require that the sample is sufficiently large so that the property of interest is well represented in the sample, and so that the sample is a sufficient statistic to provide a reliable estimate of the property in the total population. Analyzing a sample of packets in network communication traffic poses a more challenging setting where the sample does not provide sufficient statistics.

In particular, the various traffic flows, or sets of packets with a common property, can be defined as several categories in the sample, for example: flows that are represented with sufficient number of packets in the sample to provide reliable estimates of their frequencies in the total traffic; flows that appear in too few packets in the sample to provide a reliable estimate for their frequency in the total traffic; and flows that appear in the traffic but do not appear in any packet in the sample. Current solutions to estimation of number of classes in a population do not scale well to the problems of estimating flows in network, both in computation costs and accuracy.

SUMMARY

There is thus provided, in accordance with some embodiments of the invention, a method of determining a network performance property in at least one computer network, including: sampling, by a processor, traffic in active communication with the at least one computer network, in a location of the at least one network, analyzing, by the processor, the sampled traffic to group communication packets to flows, wherein a flow is defined as a set of packets with a common property selected from the group consisting of: communication protocol, port number, encryption type, source IP address and destination IP address, and predicting, by the processor, at least one network property of the at least one network based on the grouped communication packets and based on at least one traffic parameter in the at least one network. In some embodiments, the at least one traffic parameter is selected from the group consisting of: union of packet streams, intersection of packet streams, and differences of packet streams. In some embodiments, the predicted at least one network property is selected from the group consisting of: total number of flows, number of flows with a predefined characteristic, number of packets, and volume of packets.

In some embodiments, network properties may be compared between at least two network devices of the at least one network. In some embodiments, copies of randomly chosen packets may be retrieved from at least one network device of the at least one network. In some embodiments, the number of packets for each flow having a predefined characteristic may be stored in a first database. In some embodiments, the number of flows having the predefined characteristic from the first database with packets that appear a number of times in the sampled traffic, may be stored in a second database. In some embodiments, the flows from the second database with number of appearances adjusted to total number of appearances at that location in the at least one network, may be stored in a third database.

In some embodiments, values with a number of appearances larger than a predefined value, may be filtered, the filtered values may be fitted to at least one function selected from a group consisting of: exponential function, power law function and polynomial function; and the fitted function may be extrapolated to values not covered in the sampled traffic. In some embodiments, the at least one traffic parameter may be selected as an arbitrary traffic parameter. In some embodiments, the sampled traffic may be analyzed to determine one or more frequencies of flows in the at least one network. In some embodiments, a sampling rate of the sampled traffic may be predefined. In some embodiments, a sampling rate of the sampled traffic may be tuned automatically according to the traffic volume of at least one network device of the at least one network. In some embodiments, each flow may be tracked with a unique identifier. In some embodiments, a new network device may be autonomously onboarded to send traffic samples.

There is thus provided, in accordance with some embodiments of the invention, a device for determination of a network performance property in at least one network, including: a memory, and a processor in active communication with the at least one network, wherein the processor is configured to: sample traffic in a location of the at least one network, analyze the sampled traffic to group communication packets to flows, wherein a flow is defined as a set of packets with a common property selected from the group consisting of: communication protocol, port number, encryption type, source IP address and destination IP address, and predict at least one network property of the at least one network based on the grouped communication packets and based on at least one traffic parameter in the at least one network. In some embodiments, the at least one traffic parameter is selected from the group consisting of: union of data packet streams, intersection of data packet streams, and differences of data packet streams. In some embodiments, the predicted at least one network property is selected from the group consisting of: total number of flows, number of flows with a predefined characteristic, number of packets, and volume of packets.

In some embodiments, a first database may be in communication with the processor, wherein the first database is configured to store the number of packets for each flow having a predefined characteristic. In some embodiments, a second database may be in communication with the processor, wherein the second database is configured to store the number of flows having the predefined characteristic from the first database that appear a predefined number of times in the sampled traffic. In some embodiments, a third database may be in communication with the processor, wherein the first database is configured to store the flows from the second database with number of appearances adjusted to total number of appearances in the at least one network.

In some embodiments, the processor may be configured to: filter values with a number of appearances larger than a predefined value, fit the filtered values to at least one function selected from a group consisting of: exponential function, power law function and polynomial function, and extrapolate fitted values from the third database to values not covered in the sampled traffic. In some embodiments, the processor may be configured to integrate the extrapolated values over time. In some embodiments, a sampling rate of the sampled traffic may be tuned automatically according to the traffic volume of at least one network device of the at least one network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 shows a flowchart for a method of determining a network performance property in at least one network, according to some embodiments of the invention.

Figure 1:
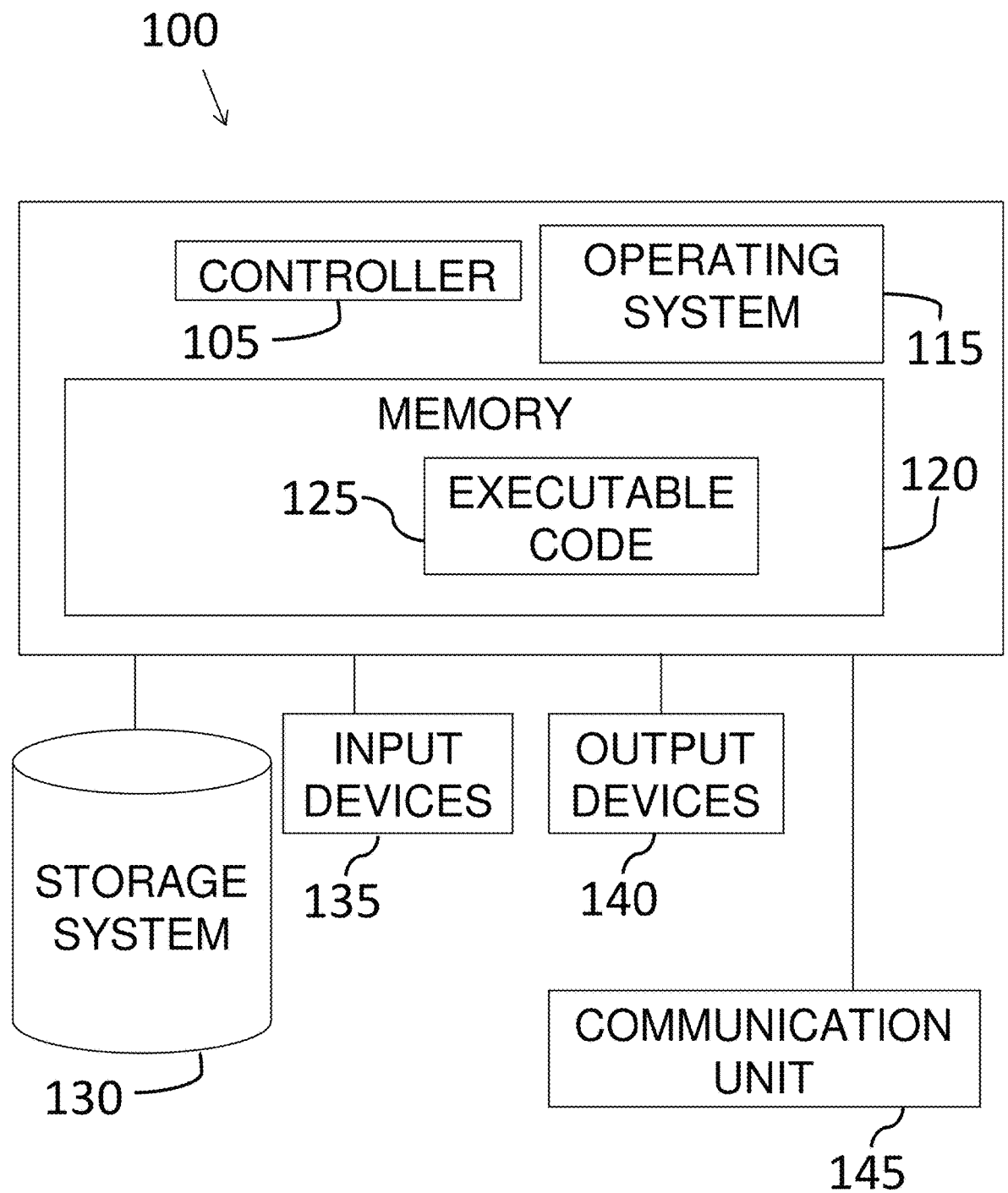
FIG. 1 shows a block diagram of an exemplary computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device 100, according to some embodiments of the invention. Computing device 100 may include a controller or processor 105 (e.g., a central processing unit processor (CPU), a programmable controller or any suitable computing or computational device), memory 120, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a computer communication network, such as, for example, the Internet. The computing device 100 may operate by executing an operating system 115 and/or executable code 125. Controller 105 may be configured to execute program code to perform operations described herein. The system described herein may include one or more computing devices 100, for example, to act as the various devices or the components shown in FIG. 2. For example, system 200 may be, or may include computing device 100 or components thereof.

Operating system 115 may be or may include any code segment or one or more code sets (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (110) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, statistical-inference algorithms or deep-learning technology may be applied to infer complete or near-complete network visibility and/or network performance properties from small traffic samples (e.g., 1% of the traffic). In some embodiments, inferring network visibility may include deduction of a status of the network based on the collected packets from the sample. As further described hereinafter, by using traffic samples, the network architecture and hardware may no longer affect the network traffic analysis, since the analysis looks only at a small sample so there is no complexity affect in larger networks. The network architecture may consist of any combination of old networks, e.g. legacy networks, (with physical network devices), private cloud networks (with virtual network devices), and public-cloud networks. The network architecture may include a physical fiber layer and/or a wireless layer and/or an Internet of Things (IOT) network and/or a cloud-based network. In addition, a dedicated "collector" (physical device, virtual device, or of a public cloud) may be used to collect traffic samples from at least one portion of the at least one location of the entire network.

Figure 2:
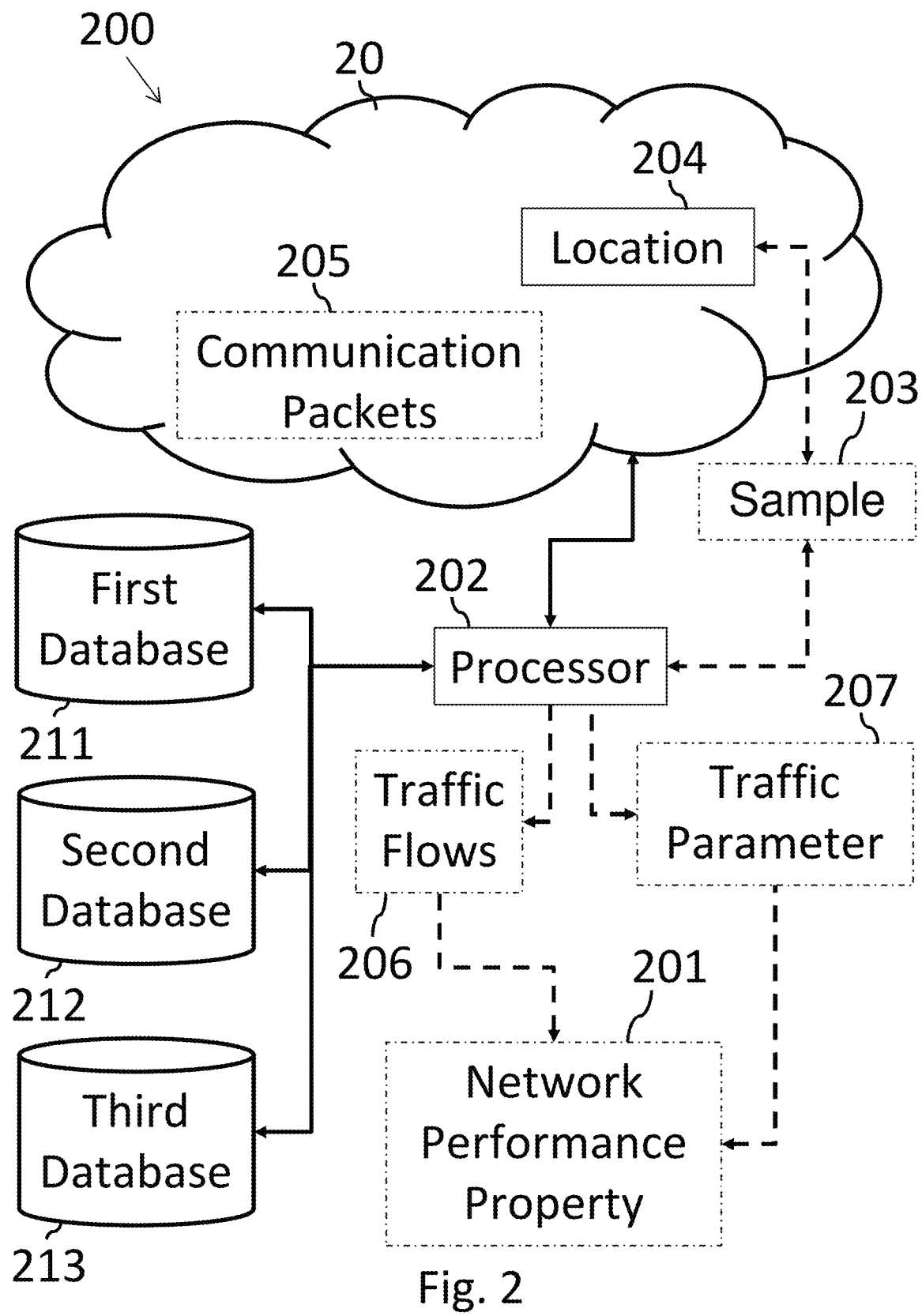
FIG. 2 shows a block diagram of a system for determining a network performance property in at least one network, according to some embodiments of the invention.

Reference is now made to FIG. 2, which shows a block diagram of a system 200 for determining a network performance property 201 in at least one computer network 20, according to some embodiments. In FIG. 2, hardware elements are indicated with a solid line and the direction of arrows may indicate the direction of information flow.

The system 200 may include a processor 202 (e.g., such as the controller 105 shown in FIG. 1) in active communication with at least one network 20. For example, the at least one network 20 may be a computer network with at least partial wireless communication (e.g., via Wi-Fi, Bluetooth, etc.). In some embodiments, the processor 202 may be actively connected to the at least one network 20 in order to sample the traffic there, though the processor 202 may or may not perform other functions of the at least one network 20. For instance, in some embodiments, the processor 202 may be in a computing device physically connected to the at least one network 20 for traffic sampling.

In some embodiments, the processor 202 may analyze traffic (e.g., analyze communication data packets) passing through the at least one network 20 with a sample 203, such that the network performance property 201 may be determined from the retrieved traffic sample 203, as further described hereinafter.

In some embodiments, the processor 202 may sample traffic in a predefined location 204 of the at least one network 20. For example, the processor 202 may be a router's processor which executes dedicated software to determine the network property, or the processor 202 may be connected to the router, and sample traffic in one or more predefined nodes 204 of the at least one network 20.

In some embodiments, the processor 202 may retrieve copies of packets (e.g., randomly chosen packets) from between at least one network device or node 204 of the at least one network 20 and the processor 202 (or another part of the at least one network 20). For example, the at least one network device or node 204 may be a communication link, a single communication switch or server, a group of links and/or servers, and/or total traffic in the network. In another example, the processor 202 may retrieve copies of randomly chosen packets from the servers, network gateways, switches, routers, and/or communication links of the at least one network 20.

According to some embodiments, the processor 202 may analyze sampled traffic 203 to group or assign communication packets 205, from traffic in the at least one network 20, into groups or categories such as flows 206. A flow 206 may be defined as a set of data packets with a common property. For example, the common property may be at least one of: communication protocol, source IP address, destination IP address, encryption type, source port and destination port. In some embodiments, the processor 202 may compare network performance properties 201 between at least two network devices or nodes 204 of the at least one network 20. For example, the at least one network devices or nodes 204 may be individual links and servers, or between groups of links and servers.

In some embodiments, for the determination of the network performance property 201 by the processor 202, a (e.g., random) sample 'S' 203 may be retrieved (e.g., by sampling the traffic in the at least one network 20). The retrieved sample 'S' 203 may be obtained with a sampling rate of 'R' packets at a given time, while traversing the predefined location 'L' 204 (e.g., by connecting to some node to sample the traffic passing through the network at that location) during time interval $[t_0; t_0+t]$. For example, the location 'L' 204 may be a virtual location associated with a specific IP address, such that traffic may be sampled by a specific network device associated with the location 'L' 204. Packets may be selected into the sample 'S' by a random process of arbitrary distribution, such that, on average, one in 'R' packets may be included in the sample. Each flow 206, from the retrieved sample 'S' 203, may be noted with a unique identifier 'f'. Thus, in some embodiments, each sampled packet may be defined as having a tuple (L; id; f), where 'L' is the location of the sample, 'id' is the packet identification, and 'f' is the flow to which this packet belongs.

In some embodiments, the processor 202 may store in a first database 211 (e.g., such as storage system 130 in FIG. 1) the number of packets 205 for each flow 206 having a predefined characteristic. For instance, the processor 202 may store in the first database 211 a two-column table 'T1', where each row may include the flow identifier 'f' and the number of packets 205 in the sample 'S' from this flow 206.

In some embodiments, the processor 202 may store in a second database 212 the number of flows 206 from the first database 211 that have a given number of packets in the sample 'S'. For instance, the processor 202 may store in the second database 212 a one-column table 'T2', where each row 'i' may include the number of flows 206 from the first database 211 that have 'i' packets in the sample 'S', for i=1, . . . , m, where 'm' is the maximum number of sampled packets of any flow in the two-column table 'T'. In some embodiments, the processor 202 may store in the second database 212 the number of flows having the predefined characteristic from the first database 211 with packets that appear a predefined number of times (or with a predetermined frequency) in the sampled traffic.

In some embodiments, the processor 202 may store in a third database 213 the number of flows 206 from the first database 211 that have packets in the sample 'S', with the number of flows being within a predefined range. In some embodiments, at least two of the first database 211, the second database 212, and the third database 213 may be embedded in a single storage system. For instance, the processor 202 may store in the third database 213 a two-column table 'T3', where each row i=1, . . . , k−1 may include the pair (i·R; the 'i' entry in 'T2'), where 'k' is the smallest 'i' such that the i−1 entry in 'T2' is larger than the 'i' entry. In some embodiments, the processor 202 may store in the third database 213 the flows from the second database 212 with number of appearances (or frequency) adjusted to total number of appearances at that location 204 in the at least one network 20. In some embodiments, the processor 202 may store values that are filtered, for example by removing flows with a number of appearances (or frequency) larger than a predefined value and/or integrated and/or extrapolated to values not appearing in the sampled traffic. After filtering, the values may be fitted to at least one function selected from a group consisting of: exponential function, power law function and polynomial function.

The processor 202 may calculate a function that best fits (e.g., using curve fitting) the row data in 'T3', for instance from a set of possible functions. For example, the set of possible functions may be a set of exponential functions $f(x)=ae^{bx}+c$ for constants a, b, c. Another example is the set of power law functions $f(x)=ax^b+c$ for constants a, b, c. The chosen function may be integrated as 'E1' in the range (0; S(k)−1). In some embodiments, the total number of flows in the time interval $[t_0; t_0+t]$ may be determined or predicted, by the processor 202, as EF=E1+E2, where 'E2' is the sum of entries in the table 'T2'.

Figure 3:
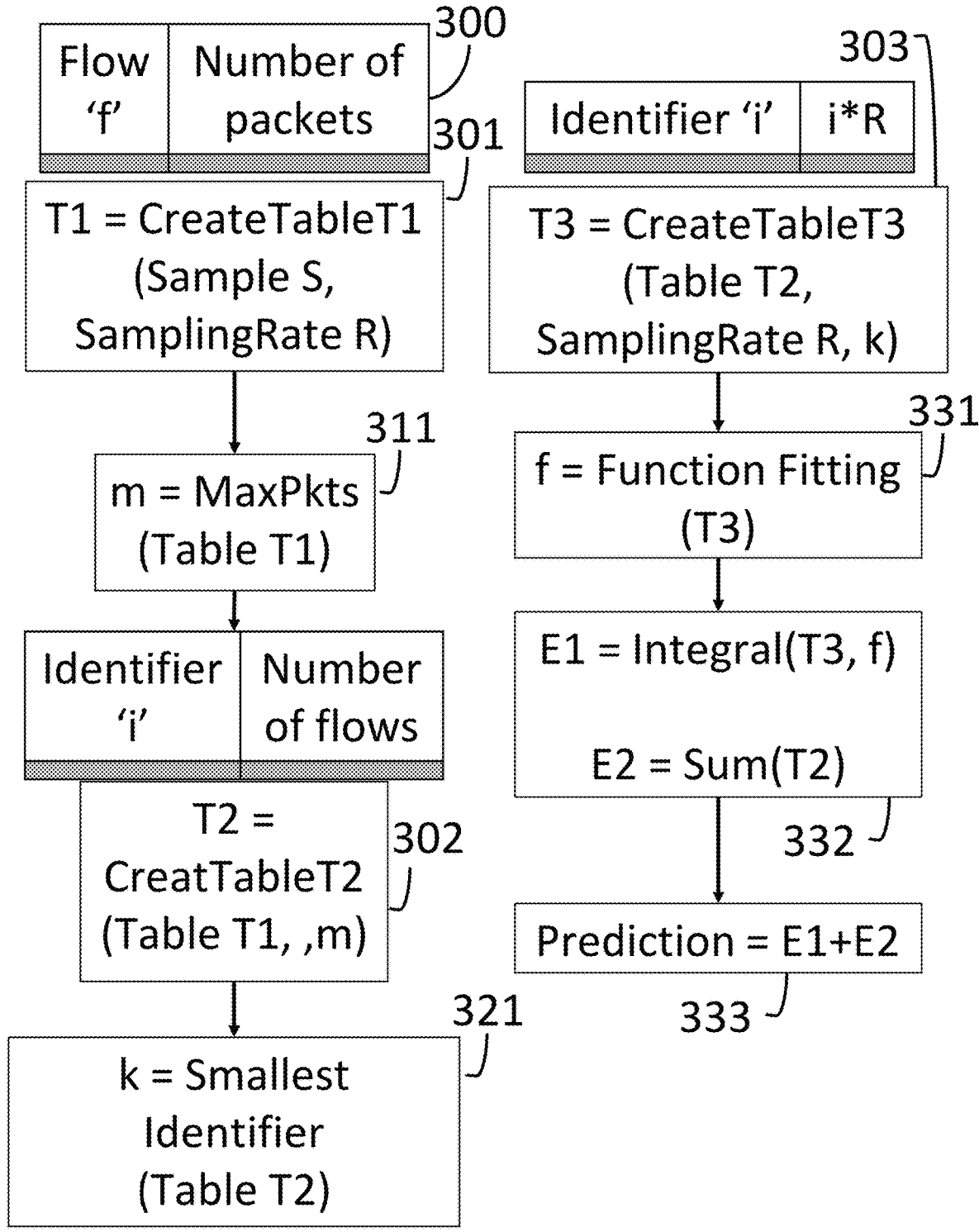
FIG. 3 shows a flowchart for an algorithm to predict the number of flows given a sample 'S' and sampling rate 'R', according to some embodiments of the invention.

Reference is now made to FIG. 3, which shows a flowchart for an algorithm to predict or determine the number of flows given a sample 'S' and sampling rate 'R', according to some embodiments. A first table T1 301 (e.g., a two column table) may be created based on the sample 'S' and sampling rate 'R', with a unique identifier f for each flow 300 and the known number of packets in the sample from this flow.

The value 'm' 311 may indicate the maximum number of sampled packets of any flow in the table T1. A second table T2 302 (e.g., a one column table) may be created in which the row i=1, . . . m stores the number of flows in the table T1 301 that each has 'I' packets in the sample. The value 'k' 321 may indicate the smallest 'i' such that the i−1 entry in T2 302 may be greater than the I entry.

A third table T3 303 (e.g., a two column table) may be created where i=1, . . . k−1 with a function "f" that best fits the row data in T3 303. The chosen function may be integrated with E1 332 as the value of the integral, and E2 as the value of the sum. Accordingly, the prediction for the total number of flows may be EF=E1+E2.

According to some embodiments, the predicted at least one property such as a network performance property 201 may be determined as at least one of: total number of flows 206, number of flows 206 with a predefined characteristic, number of packets, and volume of packets, etc. The predefined characteristic may include at least one of source IP address, destination IP address, communication protocol type, port number, encryption type, etc.

For example, in a network of an entire city, when sampling 1% of the traffic (e.g., with sampling rate 'R'=100) and associating a flow with multiple fields, e.g., 5-tuple fields (with Protocol number, Source IP address and port, Destination IP address and port) as well as looking at a time interval of 't'=1 minute, the total number of packets may be 211,191, associated with 3,566 unique flows. In this example, the sample 'S' includes 2,091 packets associated with 'E2'=241 sampled flows. Thus, the tables with example hashed flow values in the example first database, the example second database, and the example third database may be:

T1 TABLE

| 'f' | Number of sampled packets |
|---|---|
| (6, 10.0.0.0, 80, 20.0.0.0, 10) | 312 |
| ... | |
| (6, 1.1.1.1, 555, 2.2.2.2, 5) | 1 |

T2 TABLE

| 'i' | Number of flows |
|---|---|
| 312 | 1 |
| 284 | 1 |
| 255 | 1 |
| 240 | 1 |
| 125 | 1 |
| 111 | 1 |
| 77 | 1 |
| 69 | 1 |
| 50 | 1 |
| 14 | 2 |
| 6 | 1 |
| 5 | 4 |
| 4 | 3 |
| 3 | 6 |
| 2 | 25 |
| 1 | 190 |

T3 TABLE

| 'i'*R | Number of flows |
|---|---|
| 600 | 1 |
| 500 | 4 |
| 400 | 3 |
| 300 | 6 |
| 200 | 25 |
| 100 | 190 |

In some embodiments, the function may be extended to values under i*R in Table T3 (e.g., under the value 100) using, for example, curve-fitting of the exponential family functions $f(x)=ae^{bm}+c$ that may yield (a=1, b=-1, c=38.167), and integrating f(x) in the range [1,100] may yield 'E1'=3,778. Finally, the number of flows may be estimated as EF=E1+E2=3,778+241=4019, while the actual (e.g., "real") number of flows may be 3,566, accordingly with a ~12.7% estimation error.

For example, the processor 202 may be configured to predict the number of flows 206 that satisfy various properties of traffic from a (e.g., random) sample of packets. In another example, the processor 202 may be configured to predict the total number of different flows 206 in a given time interval, including flows that are not represented in the sample 203.

In some embodiments, the processor 202 may accordingly predict at least one network performance property 201 of the at least one network 20 based on the flows 206 and based on at least one predefined traffic parameter 207 in the at least one network 20. The at least one traffic parameter 207 may be predefined based on a specific data analysis method for treating different data packet streams in the at least one network 20. For example, the at least one traffic parameter 207 may be selected from the group consisting of: union of data packet streams, intersection of data packet streams, and differences of data packet streams. In some embodiments, the at least one traffic parameter 207 may be selected as an arbitrary traffic parameter.

According to some embodiments, the processor 202 may be configured to predict or determine a number of different flows 206 satisfying a predefined traffic parameter 207. For example, the traffic parameter 207 may include having the same origin/destination IP address, and/or having the same communication protocol as the parameter in the sample or flow. In another example, the traffic parameter 207 may include a set of flows active during one interval but not during a second time interval, or active in both time intervals. In yet another example, the traffic parameter 207 may include a set of flows active (e.g., such that the presence of the flow may be detected) in one location 204 (e.g., a node of the at least one network 20) but not active in a different location, or active in both locations, etc.

Figure 4A:
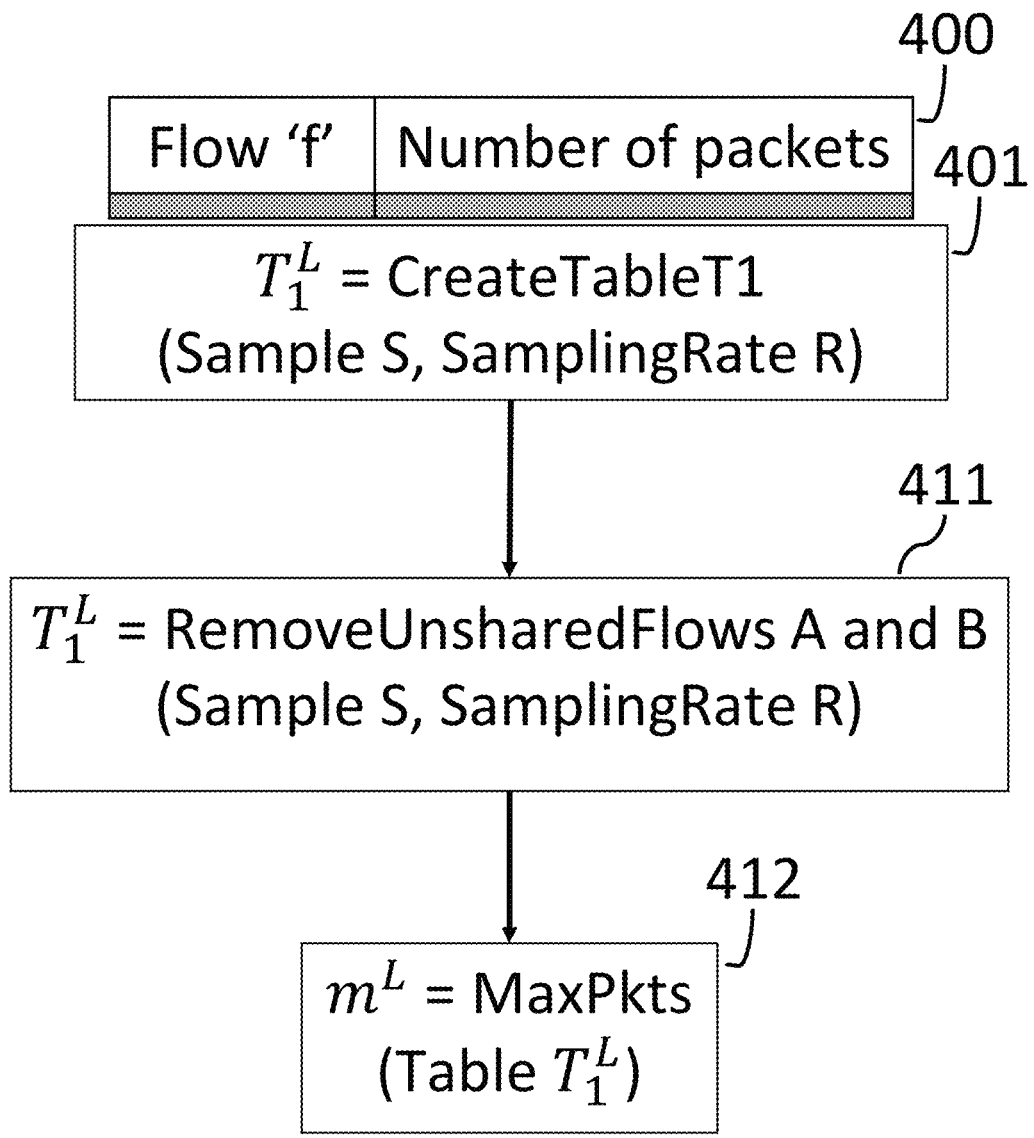
FIGS. 4A-4B show flowcharts for an algorithm to predict the number of flows given a sample '$S_A$', sample, '$S_B$' and sampling rate 'R', according to some embodiments of the invention.
Figure 4B:
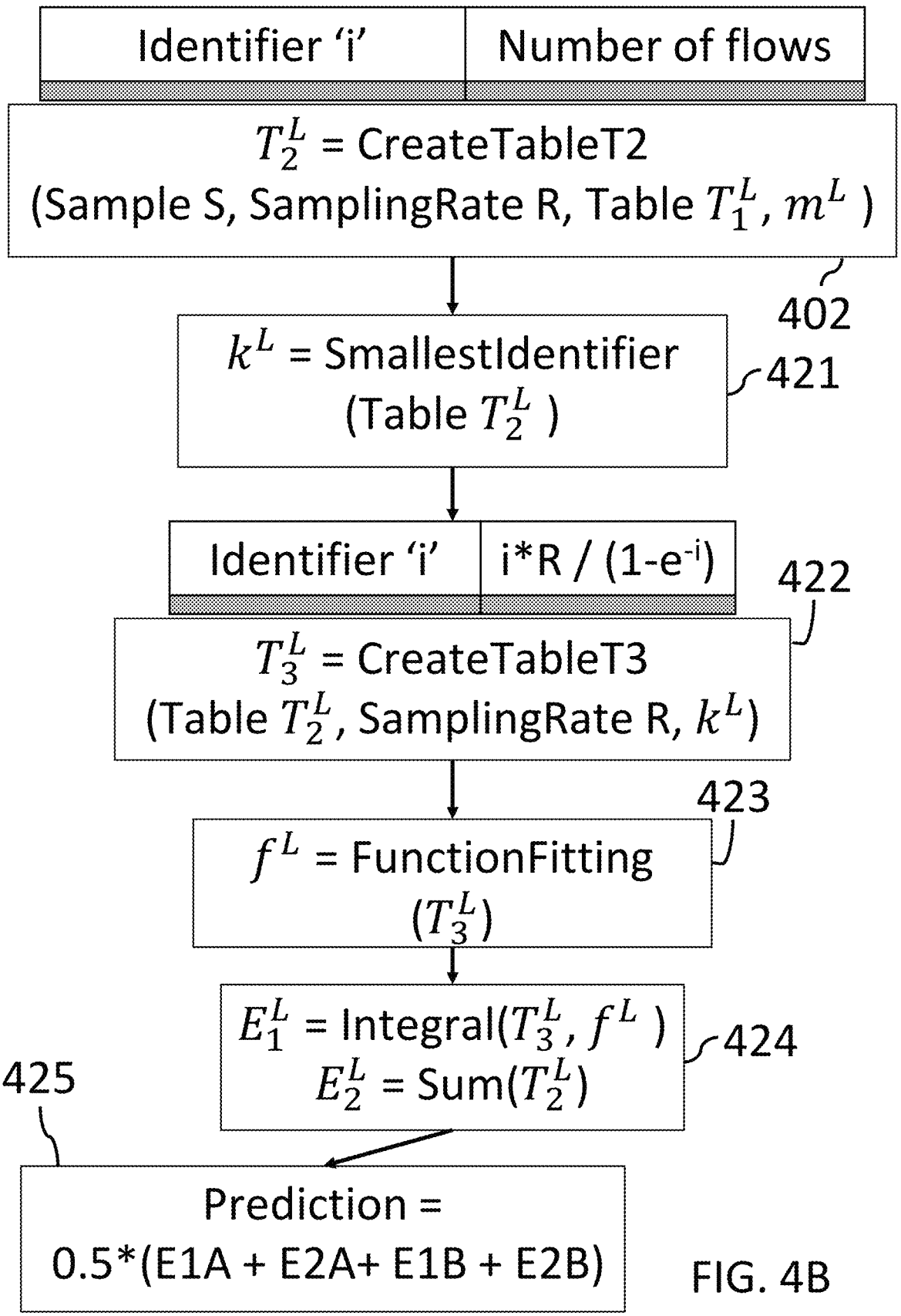

Reference is now made to FIGS. 4A-4B, which show flowcharts for an algorithm to predict intersection of flows given a sample '$S_A$', sample '$S_B$', and sampling rate 'R', according to some embodiments.

In order to process any traffic parameter 207, in some embodiments, a maximum likelihood algorithm for estimating the set function from a sample 203 may be used. Let 'A' and 'B' be two sets of flows 206, where the size of 'A' and/or 'B' needs to be estimated from the sample 203. For example, these may be flows 206 in different locations 204 in the at least one network 20 at a given time interval, or the flows 206 in a given location 204 at different time intervals, etc.

For samples '$S_A$' and '$S_B$' of sampling rate '$R_A$' and '$R_B$', from the packets 205 of flows 'A' and 'B' 206, respectively, a first algorithm may estimate the number of flows 206 in A∩B from the samples '$S_A$' and '$S_B$'. Accordingly, for each element sampled from the flow 'B' it may be determined if this element is also in the flow 'A'. Thus, the values $|F_A \cap SF^k_B|$, for k≥1, may correspond to uniform rejection sampling from 'B' that may include only packets in the flow (A∩B).

In some embodiments, the sampling rate is tuned automatically according to the traffic volume of the network device so as to meet a specific criteria, for example a sampling rate of at least 10 packets' respective samples per minute. The sampling rate may also be tuned according to various states detected by the system, for example: when an attack/threat is detected, the sampling rate may be automatically increased/decreased accordingly so as to assure: (1) the sampling criteria above, (2) that no reflection of the attack affects the system's network (for example, a DDoS attack with enormous traffic volume, to make sure the system's network is not affected), and (3) to have the most useful information and details for root-cause analysis and investigation.

In some embodiments, in order to estimate $F_A \cap F_B$, the processor 202 may calculate $|S_{A \cap B}|$ as the number of samples in '$S_B$' that were in the flow (A∩B). The processor 202 may also or alternatively calculate $N_{A \cap B}$ as the number of packets in 'B' that are in the flow (A∩B). The process in some embodiments may conform with the following equations:

$$|S_{A \cap B}| = \sum_{k>1} k |F_A \cap SF_B^k|, \quad (1)$$

$$E[N_{A \cap B}] = N_B \frac{|S_{A \cap B}|}{|S_B|} = r|S_{A \cap B}| \quad (2)$$

$$E[N_{A \cap B}] \frac{|F_A \cap SF_B^1|}{S_{A \cap B}} = r|F_A \cap SF_B^1| \quad (3)$$

$$\widetilde{Flow}(A \cap B) = r|F_A \cap SF_B^1| + \sum_{k \geq 1} |F_A \cap SF_B^k| \quad (4)$$

In some embodiments, the requirement for determining if a flow that was sampled in 'B' is also in 'A' may not be needed. For example, estimating $|F_A \cap SF_B^k|$ with $|SF_A \cap SF_B^k|$, and with the fact that if $f \in F_B^k$ then a maximum likelihood estimation for its intensity may be $kR/t_B$, where:

$$Pr(f \notin SF_A \cap SF_B | f \in F_A \cap SF_B^k) = (1-1/r)^{krt_A/t_B} \approx e^{-kt_A/t_B} \quad (5)$$

Thus, an unbiased estimate for $|F_A \cap SF_B^k|$ may be $$\frac{|SF_A \cap SF_B^k|}{1 - e^{kt_A/t_B}}.$$

Accordingly:

$$|F_A \widetilde{\cap} F_B^k| = \begin{cases} \dfrac{r|SF_A \cap SF_B^1|}{1 - e^{t_A/t_B}} & k = 0 \\ \dfrac{|SF_A \cap SF_B^k|}{1 - e^{kt_A/t_B}} & k \geq 1 \end{cases} \quad (6)$$

$$\widetilde{Flow}(A \cap B) = \frac{r|SF_A \cap SF_B^1|}{(1 - e^{t_A/t_B})} + \sum_{k \geq 1} \frac{|SF_A \cap SF_B^k|}{1 - e^{kt_A/t_B}} \quad (7)$$

According to some embodiments, another algorithm for the estimation of number of flows in A∩B may be carried out by:

$$EF_{A \cap B} = \frac{r|SF_A \cap SF_B^1|}{(1 - e^{t_A/t_B})} + \sum_{k \geq 1} \frac{|SF_A \cap SF_B^k|}{1 - e^{kt_A/t_B}} \quad (8)$$

where '$S_A$' and '$S_B$' are samples of rate 'S' from 'A' and 'B', respectively, '$SF_A$' the number of different flows in '$S_A$', and $SF^k$ the number of flows in '$S_B$' with 'k' packets in the sample with $SF_B = \Sigma_{k \geq 1} SF_B^k$.

According to some embodiments, another algorithm for set intersections may be carried out by obtaining a random sample '$S_A$' and '$S_B$' of one in 'r' packets in the set 'A' and 'B', respectively. For L=A,B for each sample '$S_L$' a tuple (L,id,F) may be extracted, where 'id' is the packet identification, and 'F' is the flow to which this packet belongs. A two-column table $T_1^L$ 401 may be created (e.g., stored at the first database 211) where each row includes the flow identifier 'F' and the number of packets in the sample from this flow.

In some embodiments, all rows corresponding to flow identifier that do not appear in the table $T_1^B$ 401 may be removed 411 from the table $T_1^A$ 401 or otherwise disregarded. Similarly, in some embodiments, all rows corresponding to low identifier that do not appear in the table $T_1^A$ 401 may be removed 411 from the table $T_1^B$ 401 or otherwise disregarded. For L=A,B and each sample '$S_L$', a one-column table $T_2^L$ 402 may be created (e.g., stored at the second database 212) where each row i=1, . . . $m^L$ stores the number of flows, having 'i' packets in the sample, in the table $T_1^L$ 401, where '$m^L$' is the maximum number 412 of sampled packets of any flow in the table $T_1^L$ 401.

In some embodiments, a two-column table $T_3^L$ 422 may be created (e.g., stored at the third database 213) where each row i=1, . . . , $k_L$−1 includes the pair $(i \cdot R)/(1-e^{-i})$; (the i entry in $T_2^L$ 402)), where $k_L$ is the smallest 'i' 421 such that i−1 entry in $T_2^L$ 402 is larger than the i entry. The algorithm may find a function 431 that best fits the row data in $T_3^L$ 403 from a set of possible functions. For example, the set of functions may be a set of exponential functions $f(x)=ae^{bx}+c$ for constants a,b,c. In another example, the set of power law functions $f(x)=ax^b+c$ for constants a, b, c.

The chosen function may be integrated as '$E_1^L$' 432 in the range (0; S(k)−1). In some embodiments, the total number of flows in A∩B may be predicted 433, by the processor 202, as $EF=0.5*(E_1^A+E_2^A+E_1^B+E_2^B)$, where '$E_2^L$' is the sum of entries in the table '$T_2^L$' 402.

According to some embodiments, manual and/or automatic onboarding of network devices may be carried out by the system, for instance by receiving parameters of a particular device to onboard, such as its IP address, the type of the device (e.g., Cisco™ router model X, Palo-Alto™ Firewall model Y, etc.), and/or credentials (e.g., username, password, etc.) from the user. In some embodiments, traffic samples may be accordingly received from the devices using, e.g., standard sampling protocols which are built-in in the device (e.g., sFlow, NetFlow, jFlow, etc.). For example, the type of the device may be compared to a predefined database in order to identify the supported sampling protocol and associated activation instructions of that device. The device may be autonomously onboarded to send the traffic samples without requiring any action from the user. In some embodiments, instead of a specific IP address, a range of IP addresses may be provided such that the network may be scanned for identifying the device's IP address.

In some embodiments, network characteristics that summarize the state of the network may be learned, denoted as state-vectors. The number of possible features that may be used to represent network status may be infinite as parameters based on time-windows data may be set for a variety of different time durations, for example: the number of new flows compared to the previous second/minute/hour, etc. Thus, in order to be accurate and efficient, the number of features may need to be reduced. Instead of arbitrarily selecting a set of features, in some embodiments the state-vector algorithm may learn an optimal and/or efficient representation by identifying significant flows in the network and searching for a set of network features and/or fields that maximizes the network information.

According to some embodiments, the full traffic's state-vector (e.g., of the 100% traffic of which only a small sample is given) may be estimated from the given traffic samples by training a deep-learning network based on, e.g., auto-encoder architecture. This machine learning model may be trained on samples against the full network. As described above, the traffic's state-vector may be a compact summarization of the network characteristics at any given timestamp. This summarization may be used to infer complete network visibility over time and may then be used for detecting threats and attacks. For example, the state-vector may be as follows: number of packets, number of flows, traffic volume, and/or the number of new flows compared to the previous minute/hour, etc. It should be noted, that using such a machine learning model, there may be no need to assume uniform distribution of network traffic. Moreover, since analysis of small samples of the network traffic (e.g., 1% or less) is used, the processing time may be significantly smaller than existing detection methods which are based on analyzing 100% of the network traffic, thereby resulting in significantly faster response and mitigation.

After the small traffic samples are used to infer the full traffic characteristics, in some embodiments the estimated traffic state-vectors may be used to train a deep neural network, e.g., a long-short term memory LSTM sequence-to-sequence deep neural network, which learns the hidden traffic patterns preceding threats and anomalies, enabling early and accurate detection. The traffic's state-vector may be fed into another deep learning network in the LSTM model which is trained, for example, to detect threats, attacks and deviations from normal network traffic (e.g., detecting a DDoS attacks). The network may accordingly learn to identify the hidden patterns that precede unusual events and discover them in real-time, thus providing accurate and fast detection in advance.

Reference is now made to FIG. 5, which shows a flowchart for a method of determining a network performance property in at least one network, according to some embodiments.

At Step 501, in some embodiments, traffic in a predefined location (e.g., defining the location in a portion of the computer network to be examined) of the at least one network may be sampled, for instance by a processor in active communication with the at least one network.

At Step 502, in some embodiments, the sampled traffic may be analyzed (e.g., by the processor) to group communication packets to one or a plurality of flows based on their parameters. For example, communication packets may be grouped to a particular flow when their parameters (e.g., IP address) are associated with that flow. In some embodiments, a flow may be defined as a set of packets with a common property such as communication protocol, source port number, destination port number, source IP address and destination IP address, etc. For example, a flow may be defined as the same source IP address, such that in the following three packets: 1.1.1.1, 2.2.2.2, 1.1.1.1, the packets may be grouped into the two flows "1.1.1.1" and "2.2.2.2".

At Step 503, in some embodiments, at least one network performance property of the at least one network may be predicted (e.g., by the processor), e.g., based on the grouped communication packets and based on at least one predefined traffic parameter in the at least one network. In some embodiments, the at least one predefined traffic parameter may be selected from the group consisting of: union of data packet streams, intersection of data packet streams, and differences of data packet streams. In some embodiments, the predicted at least one network performance property may be selected from the group consisting of: total number of flows, number of flows with a predefined characteristic, number of packets, and volume of packets.

In some embodiments, a user interface may be utilized to provide network visibility and/or critical information of the network for the user. Such a display (e.g., with a dedicated dashboard) may include at least one of user defined notifications, querying across multiple data fields (e.g., source, destination, geographic location such as a country or a city, routing interface, IP address, port, etc.), metrics, filters, network volume statistics (e.g., average bandwidth, top flows, etc.), number of flows, and/or number of packets (e.g., for a particular portion of the network) as well as attacks and threats information, root-cause analysis, etc.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A method of determining a network performance property in at least one computer network, the method comprising:

sampling, by a processor, traffic in active communication with the at least one computer network, in a location of the at least one network, wherein the sampling comprises retrieving copies of randomly chosen packets from at least one network device of the at least one network, wherein packets are randomly chosen for sampling at a predefined sampling rate of retrieving one packet out of every 'R' packets, and wherein each packet of the randomly chosen packets has the same probability to be sampled;

analyzing, by the processor, the sampled traffic to group the randomly chosen packets to flows, wherein a flow is defined as a set of packets with a common property selected from the group consisting of: communication protocol, port number, source IP address and destination IP address; and predicting, by the processor, at least one network property of the at least one network based on the grouped randomly chosen packets and based on at least one traffic parameter in the at least one network;

wherein the at least one traffic parameter is selected from the group consisting of: union of packet streams and intersection of packet streams, and wherein the predicted at least one network property is selected from the group consisting of: total number of flows, number of flows with a predefined characteristic, number of packets, and volume of packets.

2. The method of claim 1, further comprising comparing network properties between at least two network devices of the at least one network.

3. The method of claim 1, further comprising storing, in a first database, the number of packets for each flow having a predefined characteristic.

4. The method of claim 3, further comprising storing, in a second database, the number of flows having the predefined characteristic from the first database with packets that appear a number of times in the sampled traffic.

5. The method of claim 4, further comprising storing, in a third database, the flows from the second database with number of appearances adjusted to total number of appearances at that location in the at least one network.

6. The method of claim 5, comprising:
filtering values with a number of appearances larger than a predefined value;
fitting the filtered values to at least one function selected from a group consisting of:
exponential function, power law function and polynomial function; and
extrapolating the fitted function to values not covered in the sampled traffic.

7. The method of claim 1, wherein the at least one traffic parameter is selected as an arbitrary traffic parameter.

8. The method of claim 1, further comprising analyzing the sampled traffic to determine one or more frequencies of flows in the at least one network.

9. The method of claim 1, wherein the sampling rate of the sampled traffic is tuned automatically according to the traffic volume of at least one network device of the at least one network.

10. The method of claim 1, further comprising tracking each flow with a unique identifier.

11. The method of claim 1, further comprising autonomously onboarding a new network device to send traffic samples.

12. A device for determination of a network performance property in at least one network, the device comprising:
a memory; and
a processor in active communication with the at least one network, wherein the processor is configured to:
sample traffic in a location of the at least one network, wherein the sampled traffic comprises copies of randomly chosen packets from at least one network device of the at least one network, wherein packets are randomly chosen for sampling at a predefined sampling rate of retrieving one packet out of every 'R' packets, and wherein each packet of the randomly chosen packets has the same probability to be sampled;
analyze the sampled traffic to group the randomly chosen packets to flows, wherein a flow is defined as a set of packets with a common property selected from the group consisting of: communication protocol, port number, source IP address and destination IP address; and
predict at least one network property of the at least one network based on the grouped the randomly chosen packets and based on at least one traffic parameter in the at least one network,
wherein the at least one traffic parameter is selected from the group consisting of: union of data packet streams and intersection of data packet streams, and
wherein the predicted at least one network property is selected from the group consisting of: total number of flows, number of flows with a predefined characteristic, number of packets, and volume of packets.

13. The device of claim 12, further comprising a first database in communication with the processor, wherein the first database is configured to store the number of packets for each flow having a predefined characteristic.

14. The device of claim 13, further comprising a second database in communication with the processor, wherein the second database is configured to store the number of flows having the predefined characteristic from the first database that appear a predefined number of times in the sampled traffic.

15. The device of claim 14, further comprising a third database in communication with the processor, wherein the first database is configured to store the flows from the second database with number of appearances adjusted to total number of appearances in the at least one network.

16. The device of claim 15, wherein the processor is configured to:
filter values with a number of appearances larger than a predefined value;
fit the filtered values to at least one function selected from a group consisting of:
exponential function, power law function and polynomial function; and
extrapolate fitted values from the third database to values not covered in the sampled traffic.

17. The device of claim 16, wherein the processor is configured to integrate the extrapolated values over time.

18. The device of claim 12, wherein the sampling rate of the sampled traffic is tuned automatically according to the traffic volume of at least one network device of the at least one network.

19. The method of claim 6, wherein predicting the total number of flows comprises:
integrating the fitted function to obtain E1;
summing the entries in the second database to obtain E2; and
summing E1 and E2 to obtain a prediction of the total number of flows.

20. The system of claim 14, wherein the processor is configured to predict the total number of flows by:
integrating the fitted function to obtain E1;
summing the entries in the second database to obtain E2; and
summing E1 and E2 to obtain a prediction of the total number of flows.

* * * * *